(12) United States Patent
Berger et al.

(10) Patent No.: US 9,501,283 B2
(45) Date of Patent: *Nov. 22, 2016

(54) CROSS-PIPE SERIALIZATION FOR MULTI-PIPELINE PROCESSOR

(71) Applicant: International Business Machines Corporation, Armonk, NY (US)

(72) Inventors: Deanna Postles Dunn Berger, Poughkeepsie, NY (US); Michael F. Fee, Cold Spring, NY (US); Edward J. Kaminski, Wynnewood, PA (US); Diane L. Orf, Somerville, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 162 days.

This patent is subject to a terminal disclaimer.

(21) Appl. No.: 14/101,622

(22) Filed: Dec. 10, 2013

(65) Prior Publication Data

US 2014/0095836 A1 Apr. 3, 2014

Related U.S. Application Data

(63) Continuation of application No. 13/495,201, filed on Jun. 13, 2012, now Pat. No. 9,378,023.

(51) Int. Cl.
G06F 9/30 (2006.01)
G06F 9/38 (2006.01)
G06F 9/50 (2006.01)
G06F 13/16 (2006.01)
G06F 13/18 (2006.01)
(Continued)

(52) U.S. Cl.
CPC .......... *G06F 9/3836* (2013.01); *G06F 9/3869* (2013.01); *G06F 9/544* (2013.01); *G06F 13/14* (2013.01); *G06F 13/1605* (2013.01); *G06F 13/1615* (2013.01); *G06F 13/1621* (2013.01); *G06F 13/1652* (2013.01); *G06F 13/1657* (2013.01); *G06F 13/1663* (2013.01)

(58) Field of Classification Search
CPC .... G06F 9/544; G06F 13/14; G06F 13/1605; G06F 13/1615; G06F 13/1621; G06F 13/1652; G06F 13/1657; G06F 13/1663
USPC ............................. 712/216; 710/39; 711/150
See application file for complete search history.

(56) References Cited

U.S. PATENT DOCUMENTS

5,323,489 A * 6/1994 Bird .............................. 711/167
5,325,495 A 6/1994 McLellan
5,765,017 A * 6/1998 Hoy et al. ....................... 712/23
(Continued)

*Primary Examiner* — Andrew Caldwell
*Assistant Examiner* — Yuqing Xiao
(74) *Attorney, Agent, or Firm* — Cantor Colburn LLP; Margaret McNamara (57) ABSTRACT

Embodiments relate to cross-pipe serialization for a multi-pipeline computer processor. An aspect includes receiving, by a processor, the processor comprising a first pipeline, the first pipeline comprising a serialization pipeline, and a second pipeline, the second pipeline comprising a non-serialization pipeline, a request comprising a first subrequest for the first pipeline and a second subrequest for the second pipeline. Another aspect includes completing the first subrequest by the first pipeline. Another aspect includes, based on completing the first subrequest by the first pipeline, sending cross-pipe unlock signal from the first pipeline to the second pipeline. Yet another aspect includes, based on receiving the cross-pipe unlock signal by the second pipeline, completing the second subrequest by the second pipeline.

7 Claims, 6 Drawing Sheets

(51) Int. Cl.
*G06F 9/54* (2006.01)
*G06F 13/14* (2006.01)

(56) References Cited

U.S. PATENT DOCUMENTS

| | | | |
|---|---|---|---|
| 5,948,089 A * | 9/1999 | Wingard | G06F 13/37 709/251 |
| 6,047,370 A | 4/2000 | Grochowski | |
| 6,092,127 A * | 7/2000 | Tausheck | G06F 12/023 710/22 |
| 6,237,071 B1 * | 5/2001 | Kim et al. | 711/169 |
| 6,460,133 B1 * | 10/2002 | Nunez et al. | 712/214 |
| 6,516,393 B1 * | 2/2003 | Fee et al. | 711/150 |
| 6,738,872 B2 * | 5/2004 | Van Huben et al. | 711/150 |
| 7,047,337 B2 * | 5/2006 | Armstrong et al. | 710/200 |
| 7,120,765 B2 * | 10/2006 | Dodd | G06F 13/1626 710/38 |
| 7,149,829 B2 * | 12/2006 | Weber | G06F 9/526 710/243 |
| 7,490,221 B2 | 2/2009 | Evans et al. | |
| 7,653,804 B2 * | 1/2010 | Lenart et al. | 712/18 |
| 2006/0047919 A1 * | 3/2006 | Jenkins et al. | 711/150 |
| 2006/0218315 A1 * | 9/2006 | Okajima | G06F 13/1605 710/35 |
| 2007/0028078 A1 * | 2/2007 | Harris et al. | 712/214 |
| 2007/0300040 A1 * | 12/2007 | Meaney et al. | 712/1 |
| 2008/0059771 A1 * | 3/2008 | Svendsen et al. | 712/218 |
| 2008/0320254 A1 * | 12/2008 | Wingard | G06F 12/0607 711/157 |

\* cited by examiner

CROSS-PIPE SERIALIZATION FOR MULTI-PIPELINE PROCESSOR

CROSS-REFERENCE TO RELATED APPLICATION

This application is a continuation of U.S. application Ser. No. 13/495,201 (Berger et al.), filed on Jun. 13, 2012, which is herein incorporated by reference in its entirety.

BACKGROUND

The present invention relates generally to computing systems, and more specifically, to cross-pipe serialization for a multi-pipeline computer processor.

A processor in a computing system may include a pipeline having a plurality of pipeline stages. This enables multiple instructions to be in the process of execution by the processor at any point in time. During the execution of any particular instruction, that instruction will pass sequentially through the various pipeline stages of the processor. Execution of that instruction may complete when the instruction is processed through the final pipeline stage of the main processor.

A processor in a computing system may additionally include multiple pipelines. In a multi-pipeline computing system, resources may be shared by requests from multiple pipelines. Starvation or lock-out scenarios may occur if access to these resources is not arbitrated fairly between requests. Even if all requestors are eventually given access to a shared resource, system performance may be negatively affected if an unequal preference is unintentionally given to one request or group or requests. A pipeline arbitration system may be used to provide fair access to a shared resource in a multi-pipeline processor system. However, resonant frequency lockouts may result, due to rank or simplified pipe request algorithms. Resource arbitration is additionally complicated in a multi-pipeline processor system in which high-level requests generate multiple subrequests that are serviced by more than one pipeline. In a system with a relatively large number of requestors, resource arbitration algorithms such as a least recently used (LRU) scheme may only handle prioritization within the same pipeline instance, and may not ensure fairness between requests that span multiple pipelines.

SUMMARY

Embodiments include a system for cross-pipe serialization for a multi-pipeline computer processor. An aspect includes receiving, by a processor, the processor comprising a first pipeline, the first pipeline comprising a serialization pipeline, and a second pipeline, the second pipeline comprising a non-serialization pipeline, a request comprising a first subrequest for the first pipeline and a second subrequest for the second pipeline. Another aspect includes completing the first subrequest by the first pipeline. Another aspect includes, based on completing the first subrequest by the first pipeline, sending cross-pipe unlock signal from the first pipeline to the second pipeline. Yet another aspect includes, based on receiving the cross-pipe unlock signal by the second pipeline, completing the second subrequest by the second pipeline.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Systems and methods for cross-pipe serialization for a multi-pipeline computer processor are provided, with exemplary embodiments being discussed below in detail. Fair resource arbitration for high-level requests that generate multiple subrequests into multiple pipelines may be achieved using cross-pipeline serialization and a request queuing mechanism within each pipeline. A first pipeline in the multi-pipeline system may be designated as a serialization pipeline, while a second pipeline functions as a non-serialization pipeline. For a high-level request that generates a first subrequest for the first pipeline and a second subrequest for the second pipeline, the first pipeline generates a cross-pipe unlock signal for the second pipeline at the time of completion of the first subrequest, triggering immediate processing of the second subrequest. This reduces latency in completion of the higher-level request. The queuing mechanism, which may be instantiated in each pipeline instance, forms a dynamically created queue of requests that are vying for access to a shared resource. In the serialization pipeline, entry to the queue may be made synchronously, i.e., when the first subrequest reaches at a certain stage of the pipeline. In the non-serialization pipeline, entry to the queue by the second subrequest may be made asynchronously at the time of receipt of the cross-pipe unlock signal, without requiring entry of the second subrequest into the pipeline.

The subrequests in the queue are prioritized on a first come first serve basis. If no requestor is using the resource at the time a request enters the queue, that request gains access to the resource, or, if the resource is being used by another requestor, the request is queued up to as next-in-line for the resource, and subsequent requests are lined up behind in the queue. The queue logic holds a head identifier, identifying the request that is currently the head of the queue, a tail identifier, identifying the request that is currently the tail of the queue, in addition to a wait condition for each request in the queue, indicating when each request in the queue will gain access to the resource. The queue logic broadcasts the current tail of its queue to all requestors in its pipeline that require the use of the same specific resource. This ensures correct sequencing of cross-pipeline requests across multiple pipelines, and reduces extra pipe passes in the non-serialization pipeline by eliminating the need for subrequests in non-serialization pipeline to make a pipe pass to determine if the shared resource is available, as a given requestor may know that the given requestor is the head of the queue before entering the pipeline.

Figure 1:
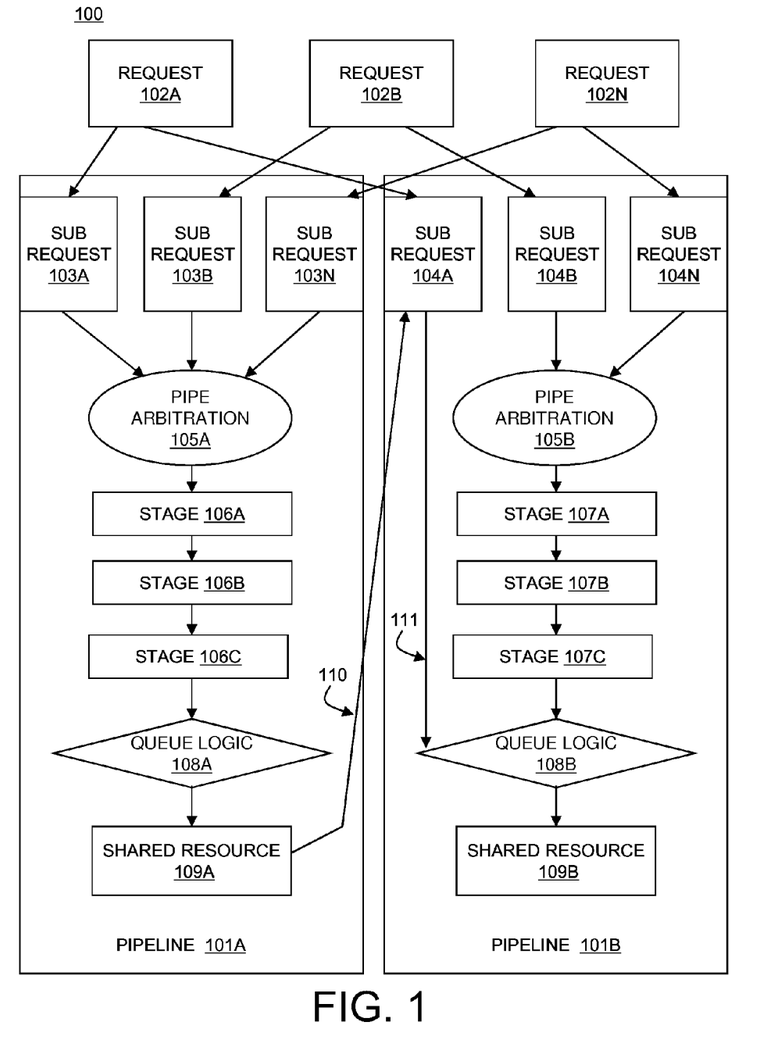
FIG. 1 depicts a system for cross-pipe serialization for a multi-pipeline processor in accordance with an embodiment.

FIG. 1 depicts a system 100 for cross-pipe serialization for a multi-pipeline processor in accordance with an embodiment. System 100 includes two pipelines, pipeline 101A and pipeline 101B. Pipeline 101A is designated as the serialization pipeline, and pipeline 101B is the non-serialization pipeline. A plurality of high-level requests 102A-N issue respective subrequests 103A-N into pipeline 101A, and respective subrequests 104A-N into pipeline 101B. One or more of the requests 102A-N may require access to shared resources 109A-B for completion. The requests 102A-N must access the shared resources 109A-B in a fair and timely matter. Pipeline 101A comprises pipe arbitration 105A, a plurality of stages 106A-C, and queue logic 108A. A subrequest enters the pipeline 101A by making a pipeline request to pipe arbitration 105A. In pipeline 101A, entry into the queue held by queue logic 108A is synchronous, i.e., subrequests 103A-N must proceed through stages 106A-C before gaining access to shared resource 109A upon reaching stage 106C. The pipeline 101A issues a cross-pipe unlock signal 110 to pipeline 101B when a first subrequest (for example, subrequest 103A, which is related to subrequest 104A in pipeline 101B) completes. Pipeline 101B also comprises pipe arbitration 105B, a plurality of stages 107A-C, and queue logic 108B. Because pipeline 101B is the non-serialization pipeline, subrequest 104A may enter the queue held by queue logic 108B asynchronously via queue request 111 upon receiving the cross-pipe unlock signal 110 from pipeline 101A indicating that subrequest 103A has successfully loaded shared resource 109A. When subrequest 104A becomes head of the queue held by queue logic 108B, subrequest 104A may then make a pipe request to pipe arbitration 105A and proceed through the stages 107A-C. Subrequest 104A is thereby guaranteed access to shared resource 109B upon reaching stage 107C. Queue logic 108B may broadcast its state to all subrequests requiring shared resource 109B within pipeline 101B in order to allow asynchronous entry, and a subrequest may enter the queue in queue logic 108B via, for example, queue request 111 of subrequest 104A.

Shared resource 109A-B may comprise a hardware assist engine in some embodiments, and the requests 102A-N may comprise a series of data store, page move, or large page (multiple cache line) move operations. In such an embodiment, the pipelines 101A-N may each handle requests related to a different subaddress space in a computer main memory. FIG. 1 is shown for illustrative purposes only; a multi-pipeline system may include any appropriate number of requests, subrequests, and pipelines with any appropriate number of respective pipeline stages. Additionally, each pipeline may have multiple shared resources of various types. Each pipeline in a multi-pipeline system may be prioritized with respect to the other pipelines, and between any two pipelines in the system, the pipeline having the higher priority may be designated as the serialization pipeline that is responsible for sending the cross-pipe unlock signal to the other pipeline. In further embodiments, there may be prioritization across more that two pipelines, as one pipeline may be assigned a highest priority, and send the cross-pipe unlock signal to the next highest priority pipeline, which may then send a second cross-pipe unlock signal to a third next highest priority pipeline, until all pipelines in the system have been serially unlocked.

Figure 2A:
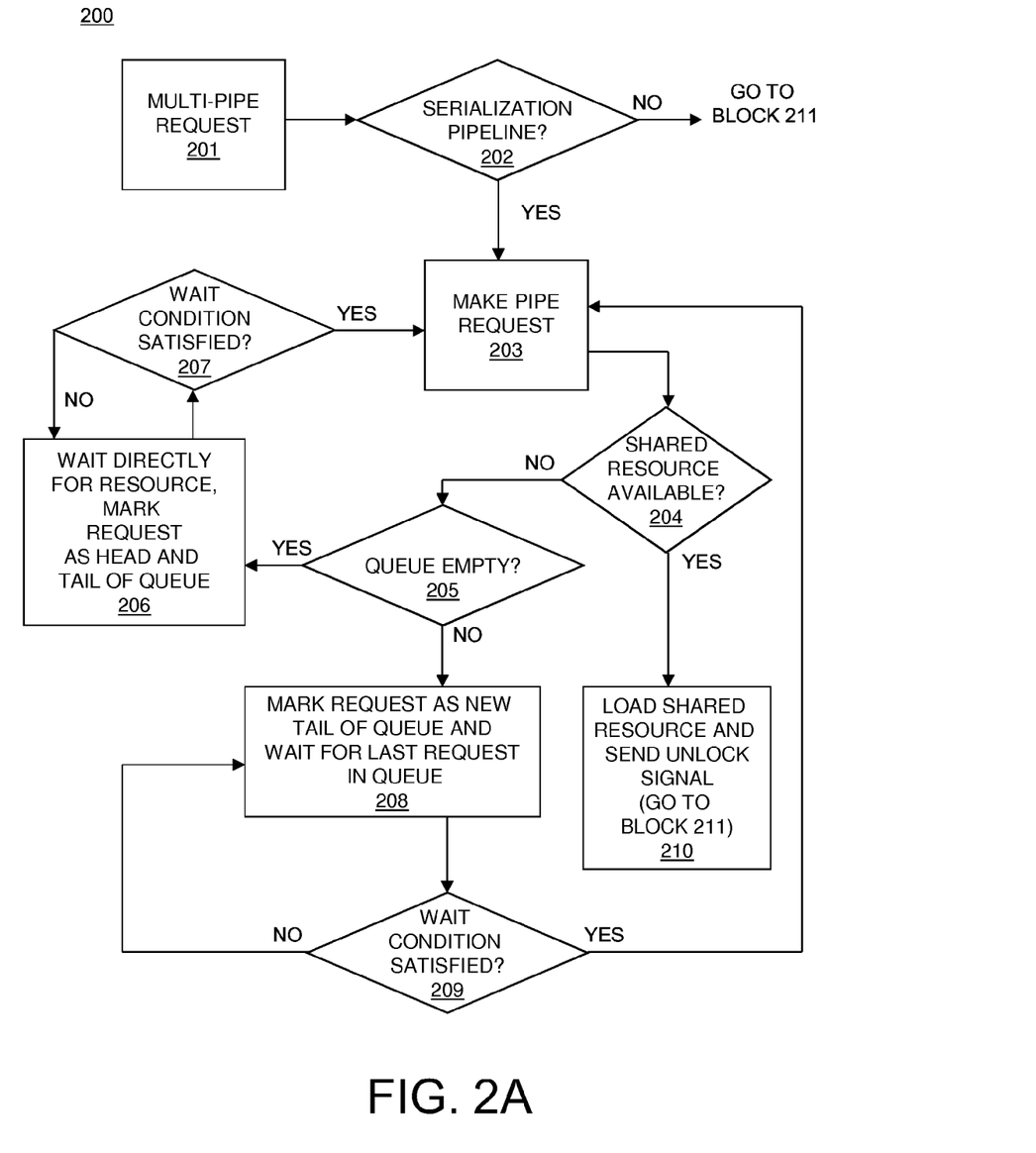
FIGS. 2A and 2B depict a process flow for cross-pipe serialization for a multi-pipeline processor in accordance with an embodiment.
Figure 2B:
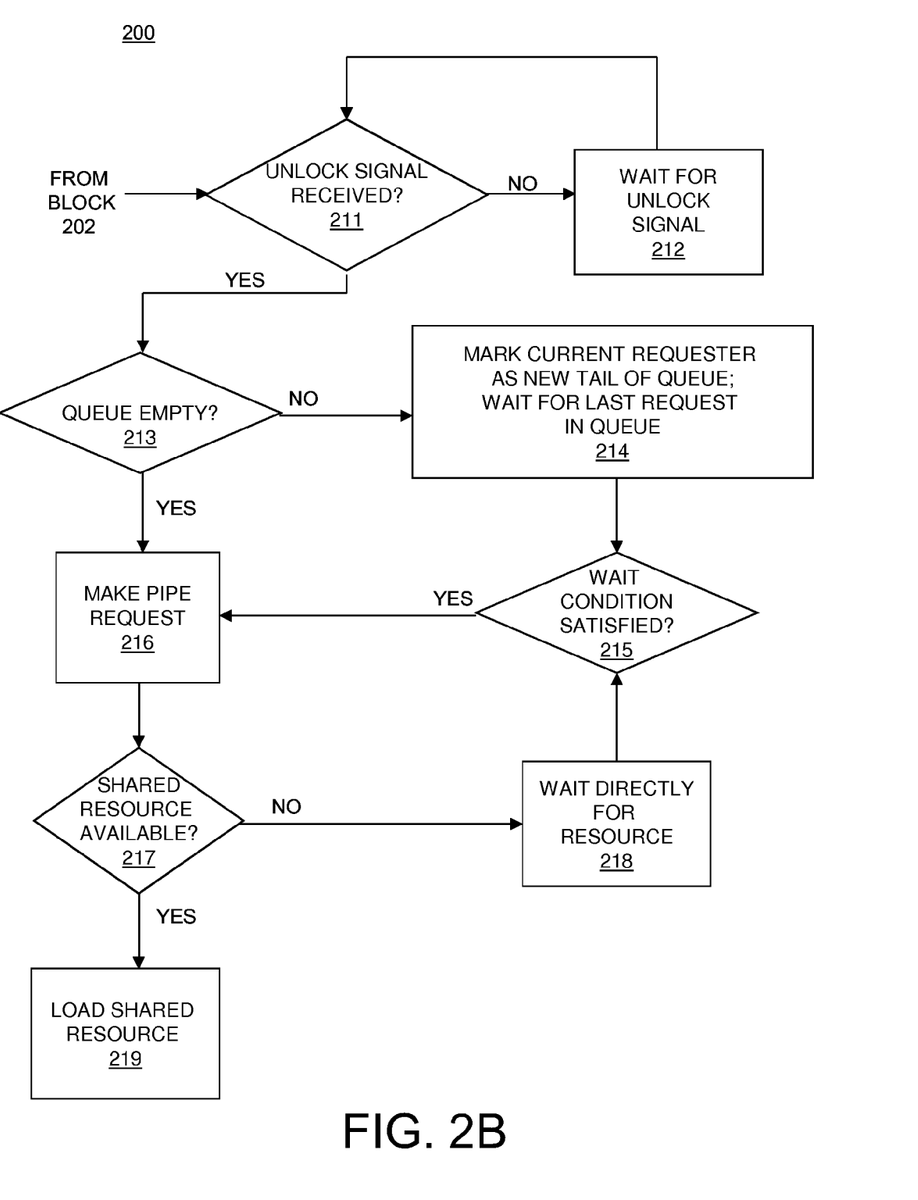

FIGS. 2A-B depicts a method 200 for cross-pipe serialization for a multi-pipeline processor in accordance with an embodiment. FIGS. 2A-B are discussed with respect to FIG. 1. FIG. 2A describes the function of serialization pipeline 101A of FIG. 1, and FIG. 2B describes the function of non-serialization pipeline 101B of FIG. 1. First, in block 201 of FIG. 2A, a high-level request 102A is launched into both of pipelines 101A-B as subrequest 103A and subrequest 104A, respectively. In some embodiments, a high-level request 102A may also generate additional subrequests in additional pipelines in block 201. Next, in block 202, subrequest 104A recognizes that it is in the non-serialization pipeline 101B, and blocks itself from making a pipeline request, proceeding to blocks 211-212 in FIG. 2B, in which the subrequest 104A waits for the cross-pipe unlock signal 110. Meanwhile, also in block 202, subrequest 103A recognizes that it is in the serialization pipeline 101A. For subrequest 103A, flow proceeds to block 203, in which subrequest 103A makes a first pipe request to pipe arbitration 105A, and proceeds through the stages 106A-C. Flow then proceeds to block 204, in which the subrequest 103A reaches stage 106C, and determines whether the shared resource 109A is currently available. If the shared resource 109A is determined to be available in block 204, flow proceeds to block 210, in which the subrequest 103A loads the shared resource 109A, completes, and sends the cross-pipe unlock signal 110 to the non-serialization pipeline 101B.

However, if it is determined in block 204 of method 200 that the shared resource 109A is not available, flow proceeds to block 205, in which it is determined if the queue in queue logic 108A is empty. If it is determined in block 205 of method 200 that the queue in queue logic 108A is empty, flow then proceeds to block 206, in which subrequest 103A is marked as both the head and the tail of the queue in queue logic 108A, and waits directly for the shared resource 109A. Then, after satisfying the wait condition (i.e., the shared resource 109A becomes available) for subrequest 103A in block 207, the subrequest 103A makes a second pipeline request to pipe arbitration 105A in block 203, and proceeds again through stages 106A-C to stage 106C. Because the subrequest 103A is the head of the queue at the time of making its second pipeline request in block 203, the shared resource 109A is available in block 204, so flow proceeds to block 210, in which the subrequest 103A loads the shared resource 109A and sends the cross-pipe unlock signal 110 to the non-serialization pipeline 101B.

If it was determined in block 205 of method 200 that the queue in queue logic 108A was not empty, flow then proceeds to block 208, in which subrequest 103A sets a wait condition latch indicating that it is waiting for the request currently designated as the tail of the queue held in queue logic 108A to release shared resource 109A. Subrequest 103A is also marked as the new tail of the queue in queue logic 108A. Then, once the wait condition (i.e., the request in the queue ahead of subrequest 103A is completed) for subrequest 103A is satisfied in block 209, subrequest 103A is the head of the queue, and makes a second pipe request to pipe arbitration 105A in block 203, proceeding again through stages 106A-C to stage 106C. Because the subrequest 103A is the head of the queue at the time of making the second pipeline request in block 203, the shared resource 109A is available in block 204, and flow proceeds to block 210, in which the subrequest 103A loads the shared resource 109A and sends the cross-pipe unlock signal 110 to the non-serialization pipeline 101B.

Turning now to FIG. 2B, when the cross-pipe unlock signal 110 for subrequest 104A is received by non-serialization pipeline 101B in block 211, flow then proceeds from block 211 to block 213 of method 200, in which subrequest 104A determines whether the queue held in queue logic 108B is empty based on the broadcasting by queue logic 108B of its current state. If it is determined in block 213 that the queue held in queue logic 108B is empty, flow proceeds to block 216, in which the subrequest 104A makes a first pipeline request to pipe arbitration 105B, proceeding through stages 107A-C. Once the subrequest 104A reaches stage 107C, it is determined whether the shared resource 109B is available in block 217. If the shared resource 109B is available in block 217, flow proceeds to block 219, in which subrequest 104A loads the shared resource 109B and completes. However, if it was determined in block 217 of method 200 that the shared resource 109B was not available, flow of method 200 proceeds to block 218, in which subrequest 104A enters the queue held in queue logic 108B. In block 218, subrequest 104A is marked as both the head and the tail of the queue in queue logic 108B (because it was determined that the resource queue was empty in block 213), and waits directly for the shared resource 109B to become available. Then, after satisfying the wait condition (i.e., the shared resource 109B becomes available) for subrequest 104A in block 215, the subrequest 104A makes a second pipeline request to pipe arbitration 105B in block 216, and proceeds again through stages 107A-C to stage 107C. Because the subrequest 104A is the head of the queue at the time of making the second pipeline request in block 216, the shared resource 109B is available in block 217, so flow proceeds to block 219, in which the subrequest 104A loads the shared resource 109B and completes.

If it was determined in block 213 of method 200 that the queue held in queue logic 108B was not empty, flow proceeds to block 214, in which subrequest 104A enters the queue via queue request 111, setting a wait condition latch indicating that it is waiting for the request currently designated as the tail of the queue to release shared resource 109B. Subrequest 104A is also marked as the new tail of the queue in queue logic 108B in block 214. Flow then proceeds to block 215, in which the subrequest 104A waits until its wait condition (i.e., the request in the queue ahead of subrequest 104A is completed) is satisfied. When the wait condition is satisfied in block 215, the subrequest 104A is head of the queue. Subrequest 104A then makes a first pipeline request to pipe arbitration 105B in block 216, proceeding through stages 107A-C, and flow of method 200 proceeds to block 217. When the subrequest 104A reaches stage 107C, the shared resource 109B will be available in block 217 because subrequest 104A is head of the queue, allowing subrequest 104A to load the shared resource 109B in block 219. Because the subrequest 104A was able to enter the queue via queue request 111 before making a pipeline request in block 216, making of a second pipeline request by subrequest 104A may be avoided, thereby reducing latency in processing of subrequest 104A and expediting completion of request 102A. In some embodiments, the pipeline 101B may be designated as a serialization pipeline with respect to another pipeline in the multi-processor system, and may send a cross-pipe unlock request to the other pipeline for another subrequest related to request 102A in block 219.

Figure 3:
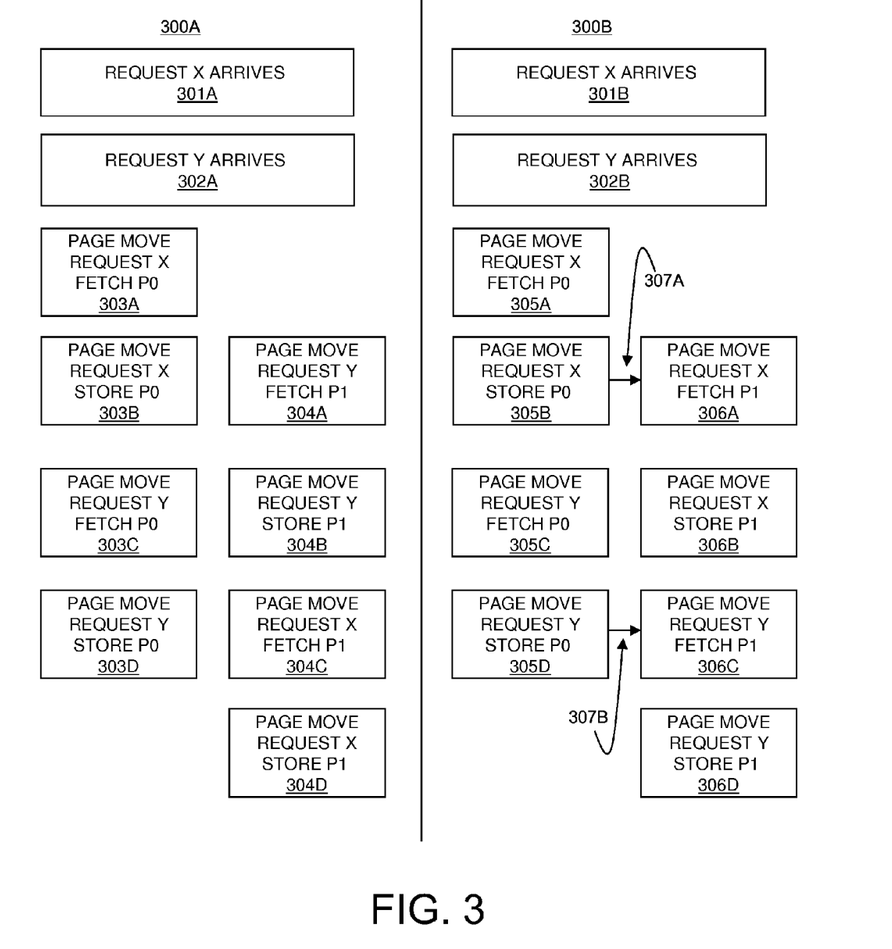
FIG. 3 depicts examples of request handling using cross-pipe serialization for a multi-pipeline processor in accordance with an embodiment.

FIG. 3 depicts examples of request handling with and without cross-pipe serialization for a multi-pipeline processor in accordance with an embodiment. Request flow 300A shows an example of request handling without cross-pipe serialization. A first request X arrives in the processor in block 301A, and later in time a second request Y arrives in the processor in block 302A. Request X and request Y each comprise data move operations that span multiple pages in memory, and the shared resource that is being used comprises a hardware assist engine. Page P0 is assigned to the first pipeline, and page P1 is assigned to the second pipeline. In request flow 300A, blocks 303A-D are handled by the first pipeline, and blocks 304A-D are handled by the second pipeline. In a first time slice, the first pipeline performs a fetch subrequest 303A for request X in page P0. In a second time slice, the first pipeline performs a store subrequest 303B for request X within page P0, while the second pipeline performs a fetch subrequest 304A for request Y within page P1. In a third time slice, the first pipeline performs a fetch subrequest 303C for request Y within page P0, while the second pipeline performs a store subrequest 304B for request Y within page P1. In a fourth time slice, the first pipeline performs a store subrequest 303D for request Y within page P0, while the second pipeline performs a fetch subrequest 304C for request X within page P1. Request Y completes in the fourth time slice. In a fifth time slice, the second pipeline performs a store subrequest 304D for request X within page P1, completing request X. As shown in request flow 300A, processing of requests X and Y is interlaced, i.e., performed in a different order within pipeline 303 than within pipeline 304, with completion of request X spanning five time slices, while completion of request Y spans 3 time slices.

Request flow 300B shows an example of request handling with cross-pipe serialization. The first request X arrives in the processor in block 301B, and the second request Y arrives in the processor in block 302B. Blocks 305A-D are handled by the first pipeline, which is assigned to page P0 and designated as the serialization pipeline, and blocks 306A-D are handled by a second pipeline, which is the non-serialization pipeline and is assigned to page P1. In a first time slice, the first pipeline performs a fetch subrequest 305A for request X in page P0. In a second time slice, the first pipeline performs a store subrequest 305B for request X within page P0, and sends a cross-pipe unlock signal 307A for request X to the second pipeline, causing the second pipeline to perform a fetch subrequest 306A for request X within page P1. In a third time slice, the first pipeline performs a fetch subrequest 305C for request Y within page P0, while the second pipeline performs a store subrequest 306B for request X within page P1. Request X completes in the third time slice. In a fourth time slice, the first pipeline performs a store subrequest 305D for request Y within page P0, and sends a cross-pipe unlock signal 307B for request Y to the second pipeline, causing the second pipeline performs a fetch subrequest 306C for request Y within page P1. In a fifth time slice, the second pipeline performs a store subrequest 306D for request Y within page P1, completing request Y. As shown in request flow 300B, completion of each of requests X and Y is not interlaced, i.e., performed in the same order on both pipelines and processing of each request X and Y spans three time slices.

Figure 4:
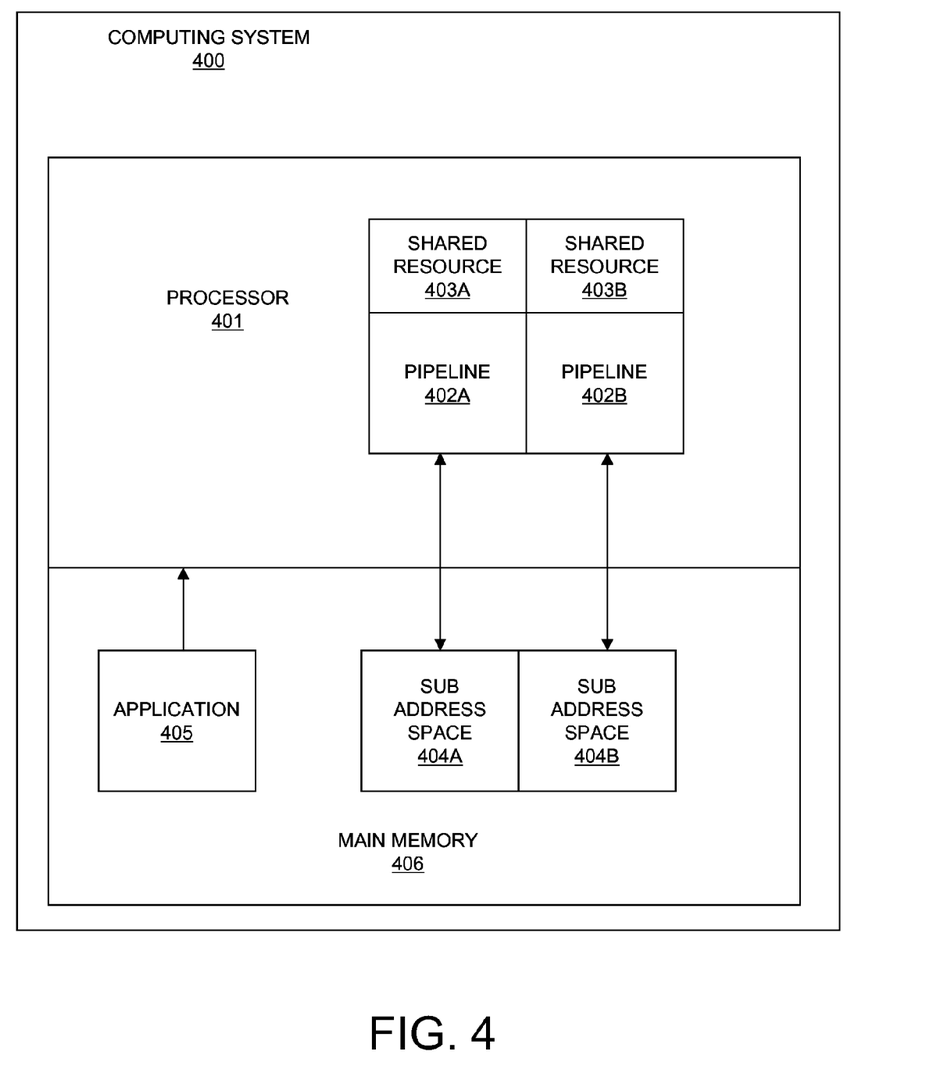
FIG. 4 depicts a computing system including cross-pipe serialization for a multi-pipeline processor in accordance with an embodiment.

FIG. 4 illustrates an embodiment of a computing system 400 including cross-pipe serialization for a multi-pipeline processor. Computing system 400 includes a processor 401, and the processor 401 includes pipelines 402A and 402B, which may comprise pipelines 101A-B as were shown in FIG. 1. Pipelines 402A-B may each perform operations within a respective subaddress space 404A-B in a main memory 406 of computing system 400; each subaddress space 404A-B may comprise a page within main memory 406 in some embodiments. Each of pipelines 402A-B have a respective instance of a shared resource 403A-B, which may comprise shared resources 109A-B of FIG. 1, that is used to complete requests that are made during execution of application 405 by processor 401. Computing system 400 is shown for illustrative purposes only; for example, a processor 401 may include any appropriate number of pipelines, and computing system 400 may include any appropriate number of processors.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
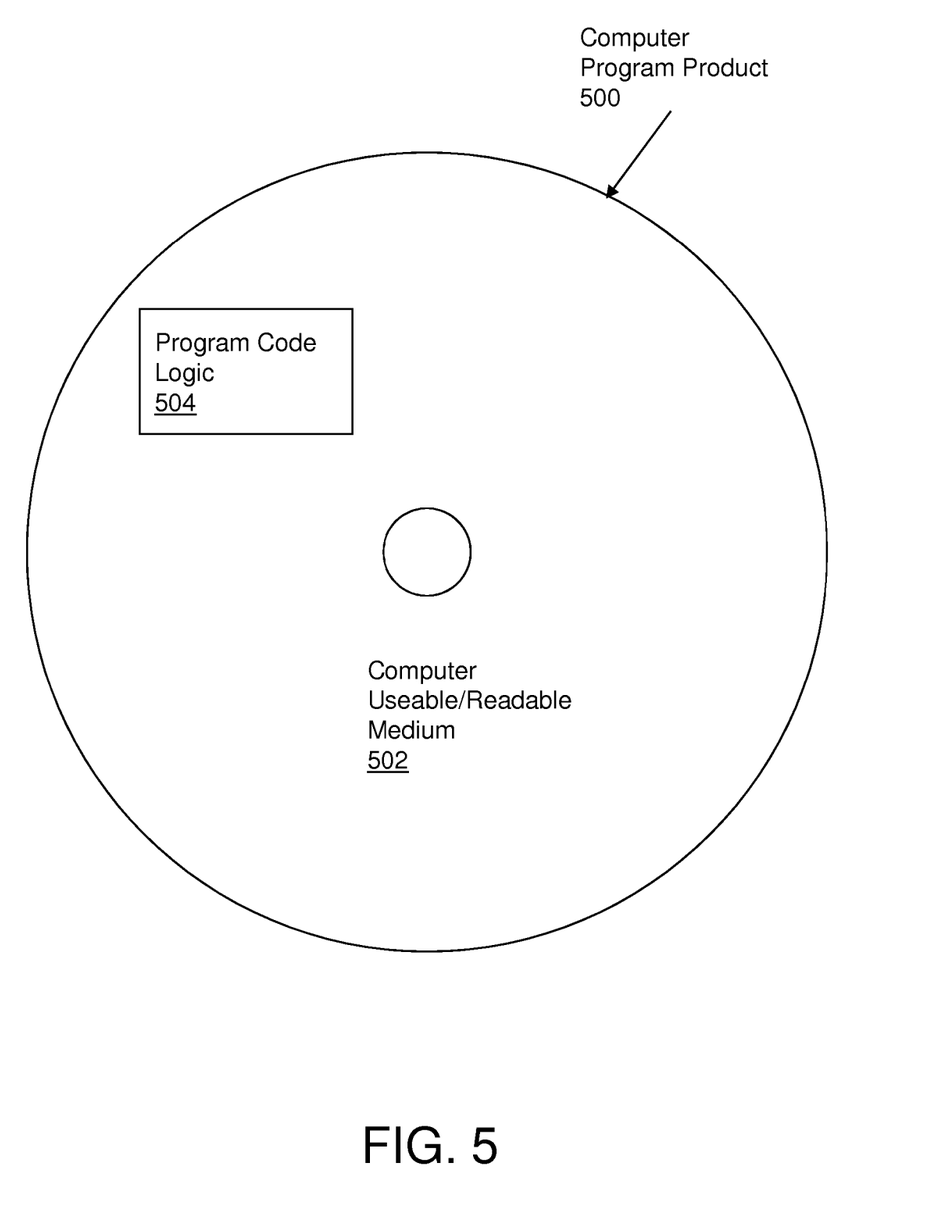
FIG. 5 illustrates a computer program product in accordance with an embodiment.

Referring now to FIG. 5, in one example, a computer program product 500 includes, for instance, one or more storage media 502, wherein the media may be tangible and/or non-transitory, to store computer readable program code means or logic 504 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include reduction in latency of request completion for requests that are processed by multiple subrequests into multiple pipelines in a computer processor.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for cross-pipe serialization for a multi-pipeline computer processor, the system comprising:
   a processor comprising a first pipeline and a second pipeline, the first pipeline comprising a serialization pipeline having one or more first pipeline stages leading to a first queue for access to a first instance of a shared resource, and the second pipeline comprising a non-serialization pipeline having one or more second pipeline stages leading to a second queue for access to a second instance of the shared resource, the system configured to perform a method comprising:
      receiving, by the processor, a request comprising a first subrequest for the first pipeline and a second subrequest for the second pipeline;
      wherein the request comprises a data move operation spanning a first page and a second page in a main memory of the computer, and wherein the first subrequest comprises a data move request within the first page, and the second subrequest comprises a data move request within the second page;
      completing the first subrequest by the first pipeline within the first page, wherein completing the first subrequest by the first pipeline comprises:
         passing the first subrequest through the one or more first pipeline stages; and
         adding the first subrequest to the first queue for access to the first instance of the shared resource, after the first subrequest has passed through the one or more first pipeline stages;
      based on completing the first subrequest by the first pipeline, sending a cross-pipe unlock signal from the first pipeline to the second pipeline; and
      based on receiving the cross-pipe unlock signal by the second pipeline, completing the second subrequest by the second pipeline within the second page, wherein completing the second subrequest by the second pipeline comprises:
         adding the second subrequest to the second queue for access to the second instance of the shared resource, responsive to the cross-pipe unlock signal, wherein the adding the second subrequest bypasses the one or more second pipeline stages; and
         passing the second subrequest to the one or more second pipeline stages after adding the second subrequest to the second queue.

2. The computer system of claim 1, wherein completing the first subrequest by the first pipeline further comprises loading the first instance of the shared resource by the first subrequest, and wherein completing the second subrequest by the second pipeline further comprises loading the second instance of the shared resource by the second subrequest.

3. The computer system of claim 1, wherein the shared resource comprises a hardware assist engine, wherein completing the first subrequest is performed based on the hardware assist engine being available, and wherein completing the second subrequest is performed based on the hardware assist engine being available.

4. The computer system of claim 2, wherein completing the first subrequest by the first pipeline comprises:
   determining whether the first instance of the shared resource is available after passing the first subrequest through the one or more first pipeline stages;
   wherein the adding the first subrequest to the first queue for access to the first instance of the shared resource is performed based on determining that the first instance of the shared resource is not available;
   wherein the loading the first instance of the shared resource by the first subrequest is performed after the adding the first subrequest to the first queue for access to the first instance of the shared resource.

5. The computer system of claim 2, wherein adding the second subrequest to the second queue comprises:
   setting a wait condition for the second subrequest, the wait condition comprising completion of a third subrequest that is a current tail of the second queue;
   setting the second subrequest as a new tail of the second queue.

6. The computer system of claim 5, wherein the passing the second subrequest to the one or more second pipeline stages is performed based on satisfying of the wait condition for the second subrequest, and wherein the loading the second instance of the shared resource by the second subrequest is performed after the passing the second subrequest to the one or more second pipeline stages.

7. The computer system of claim 2, the method further comprising, based on determining that the second queue for the second instance of the shared resource is empty:
   determining whether the second instance of the shared resource is available after passing the second subrequest through the one or more second pipeline stages;
   wherein the adding the second subrequest to the second queue is based on determining that the second instance of the shared resource is not available, and wherein the adding the second subrequest to the second queue is performed before loading the second instance of the shared resource by the second subrequest.

* * * * *